United States Patent [19]
Ianell

[11] Patent Number: 5,104,258
[45] Date of Patent: Apr. 14, 1992

[54] BIONIC DUNES

[76] Inventor: Allan W. Ianell, 221 Handsome Ave., Sayville, N.Y. 11782

[21] Appl. No.: 718,985

[22] Filed: Jun. 21, 1991

[51] Int. Cl.[5] .............................................. E02B 3/12
[52] U.S. Cl. ....................................... 405/21; 405/15; 405/17
[58] Field of Search ..................................... 405/15–17, 405/21, 20, 28–35, 258, 18, 19

[56] References Cited

U.S. PATENT DOCUMENTS

| | | |
|---|---|---|
| 20,106 | 4/1868 | Tracy . |
| 1,428,808 | 9/1922 | Schiefele . |
| 2,190,003 | 2/1940 | Hulst . |
| 2,435,568 | 2/1948 | Anderson ............................... 405/17 |
| 2,570,271 | 10/1951 | Pickett ................................... 405/17 |
| 3,326,005 | 6/1967 | Jacobs .................................... 405/17 |
| 4,345,856 | 8/1982 | Tuck . |
| 4,362,432 | 12/1982 | Conover . |
| 4,367,978 | 1/1983 | Schaaf et al. . |
| 4,417,828 | 11/1983 | de Winter ............................... 405/17 |
| 4,498,805 | 2/1985 | Weir . |
| 4,518,280 | 5/1985 | Fletcher ............................ 405/15 X |
| 4,521,131 | 6/1985 | Nandlah . |
| 4,655,637 | 4/1987 | Vignocchi ......................... 405/32 X |
| 4,804,293 | 2/1989 | Várkonyi et al. . |

FOREIGN PATENT DOCUMENTS

| | | | |
|---|---|---|---|
| 0126416 | 7/1985 | Japan ...................................... 405/17 |
| 0129315 | 7/1985 | Japan ...................................... 405/17 |

*Primary Examiner*—Dennis L. Taylor

[57] ABSTRACT

Bionic dunes for stabilizing an ocean beach and preventing the erosion thereof comprising a sheet extending the length of the beach having a vertically extending concave surface to turn back breaking waves. The toe midpoint and crest of the sheet are fixed by pilings while the sheet is backed up by water-packed sand below which a thin layer of aggregate is placed around the long pilings. The top surface of the crest and the sand is provided with vegetation to stabilize the top surface of the dune.

15 Claims, 4 Drawing Sheets

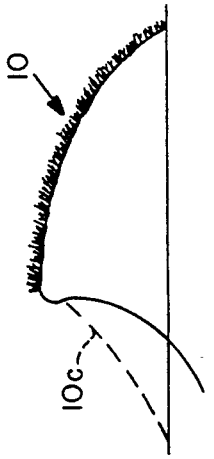
FIG.1A
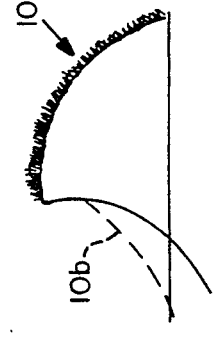
FIG.1B
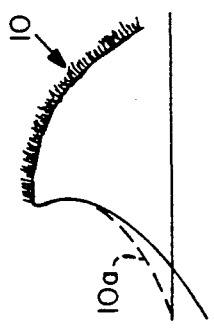
FIG.1C
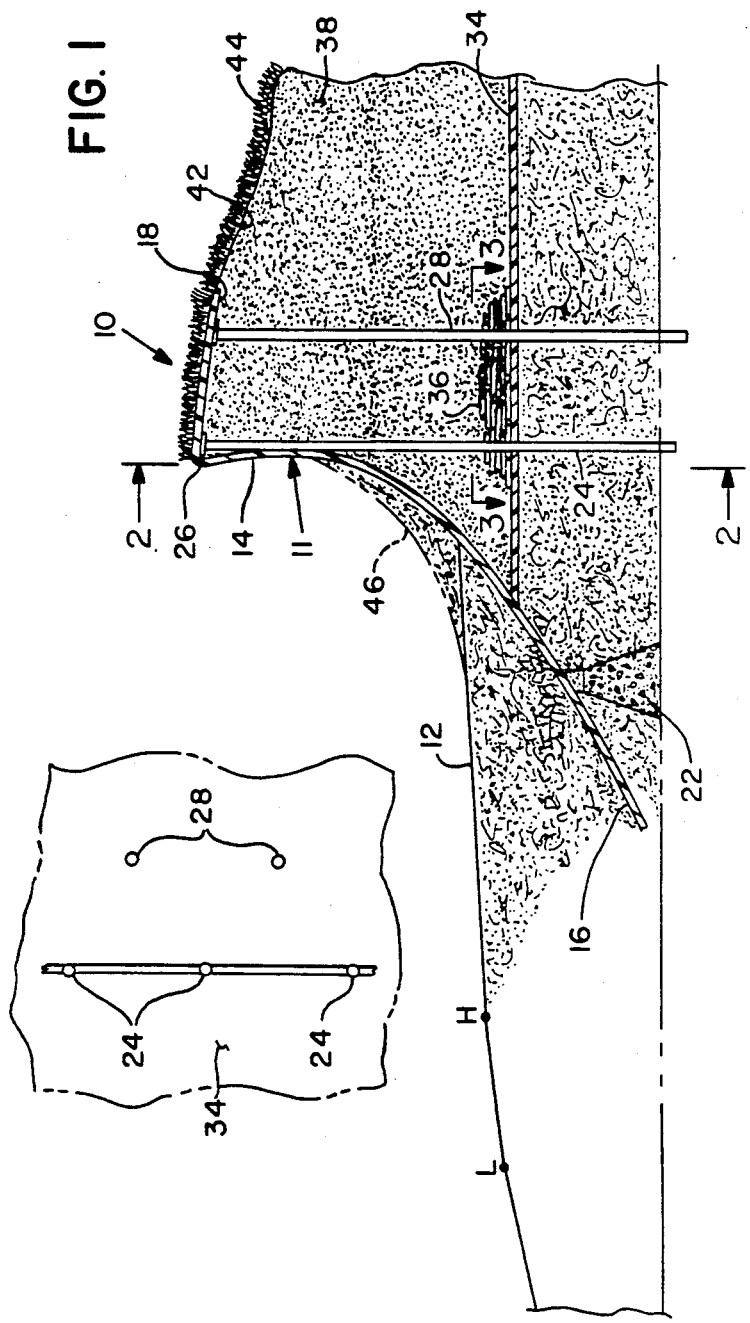
FIG.1
FIG.3

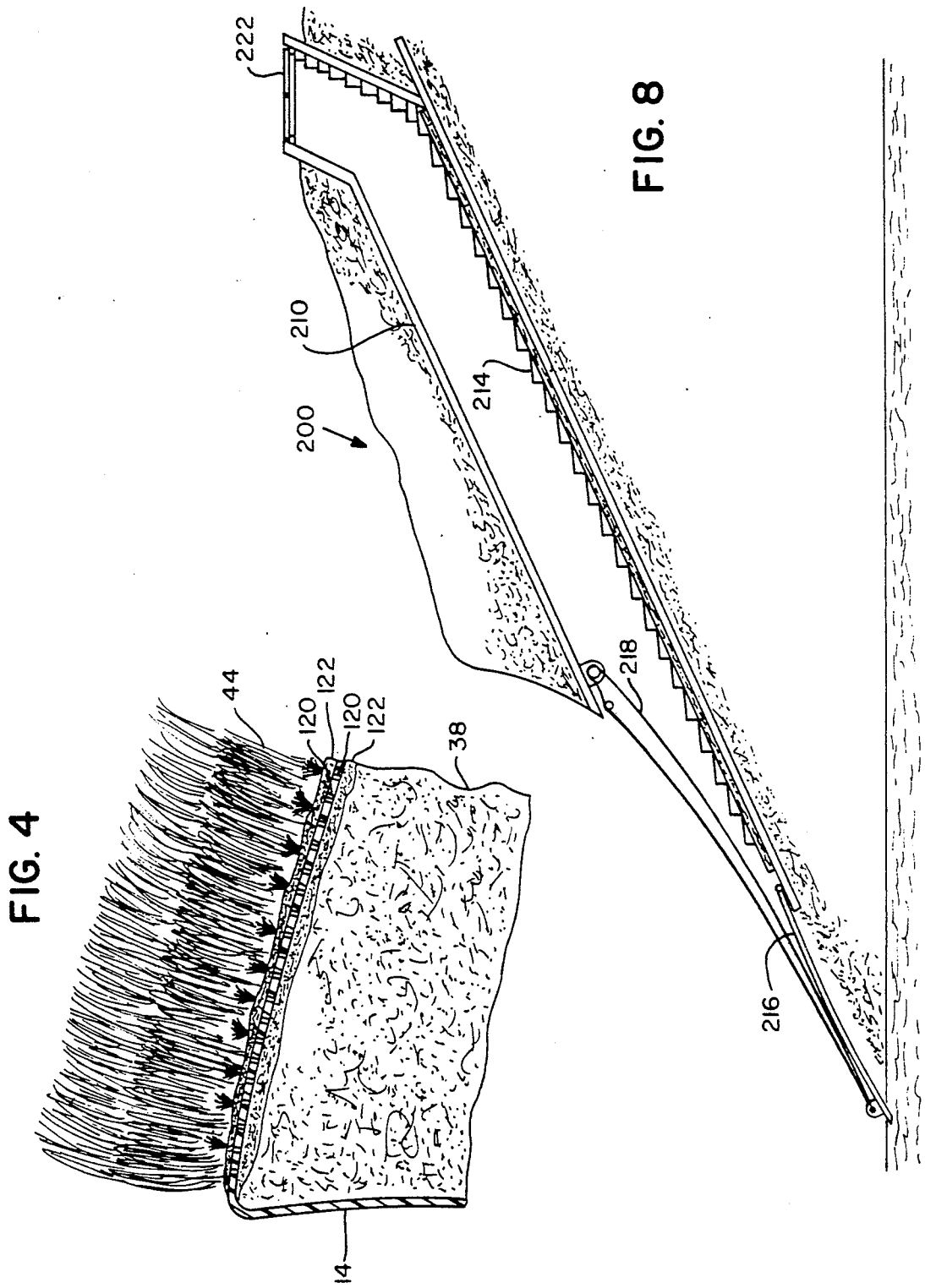

BIONIC DUNES

BACKGROUND OF THE INVENTION

This invention relates to 'bionic dunes' which can best be defined as the re-creation of eroded and missing natural primary ocean-front sand dunes, but with a very necessary improvement which would make them non-eroding, and thereby worth re-creating.

Their purpose and functions are two-fold, as they would not only protect the upland topography of barrier islands (commonly called 'barrier beaches') and the mainland behind them from increasingly powerful hurricanes, such as the type that recently ravaged the southeastern coastal states of the continental United States, but also be restorers, equalizers and stabilizers of the beaches and shorelines on their seaward side. The reasoning behind these important additional functions is given below, based on over 60 years of observation as a resident real property owner of two houses in two communities on a 'barrier beach', one of which has been in the inventor's family for more than 82 years. The other was built in 1951; both are still owned by him and have given him constant opportunities to study one beach-front with dunes and the other without dunes. He has, over many years, observed with intense interest the interactions between ocean surf-waves during severe storms and high tides, in all seasons, and the two separate sand-beach shorelines when with and without their natural primary sand dunes.

The principle in the creation of 'bionic dunes' is to provide non-eroding 'civilization resistant' oceanfront primary sand dunes systems embodying a passive (non-colliding) method of ocean surf-wave control without the fragility of the all-natural dunes with their inability to survive the many varieties of damage, such as: building on, treading on, driving on with off-road vehicles, and damages from construction machines, trucks and bulldozers disfiguring their bases, plus general acts of total disregard and/or ignorance of their importance in the balances nature brings to its diverse processes within the relationship between primary dunes and their adjacent beaches. Most of said damage has been done in the last 60 years.

A symmetrical primary oceanfront sand-dune line, in observing reciprocal processes after a series of waves have broken on a beach which is backed by a gently rising sand-dune base, is seen to lead each on-rush of sand-bearing water quickly, smoothly and quietly uphill to a 'stall-point', where the water loses its momentum, falls back toward the berm of the beach, at which time its sands in suspension begin to fall out while much of the slowly moving water is being absorbed in the porous sands of the berm of the beach, as the remaining water, if any, is met by a subsequent run of sand-carrying wave-water coming in across the berm, headed for the base of the dunes, repeating the process just described. This process, repeated every minute, for hours, days, and nights until either high tides, storms or water-surges abate, adds great amounts of sand to a beach from the dunes' base, seaward, over the berm, and to the edge of the shoreline.

The same weather and tide conditions prevailing, on a stretch of beach with no dune line, therefore: no inclined dunne-base, 'stall point', would allow the same water mass to race over and past the upland end of the berm and over the sands where a dune-line should have been, and continue into the inner parts of the island without depositing its sands in suspension on any part of the beach area. If this rush-over of water continues, it could begin eroding the area of the old dune-line over which it now rushes. Within hours a breakthrough 'cut' could become deep-enough to look like a stream-bed, later like a riverbed, and thereafter an inlet is created. This explains how important the presence of primary oceanfront sand dunes are to adjacent beach preservation.

In areas where primary dunes were sufficiently damaged to lose their effectiveness as described above, the adjacent beaches began to suffer from increasing erosion. It was at that time that community managers and property owners, in some of the affected communities, began to show interest in erecting sand-catching barriers on their beaches. Still not aware that the loss of dunes could have any bearing on their beach problems, they concentrated on securing federal, state or county funds to install rock groins at a 90 degree angle to the beaches. Other blunt confrontational structures also came into vogue, such as jetties, seawalls, revetments, sta-pods and offshore rockpiles. Soon after installation of any one of the foregoing, off and on the shorelines of many eastcoast states, extremely damaging side-effects were connected to their presence. Groins produced 'scouring action' on the downdrift side of the littoral drift off Long Island, N.Y., causing loss of as much as half the width of beach for thousands of yards down the beach. Jetties caused uncontrolled sand deposits on their updrift side with sand overflowing the jetties' landward rocks and being washed into the inlet it was designed to protect, forming unwanted shoal waters and sandbars as well as accretion on the opposite bank of the inlet. Seawalls, built along upland sides of beach berms caused a single-wall sluiceway effect, resulting in complete loss of entire beaches, such as along the 'Jersey Shore' in New Jersey, south of N.Y. harbor. Revetments cannot be considered to be much better than seawalls, because, they, too, can be undercut at their bases and moved into disarray in heavy storms, losing their ability to protect much of anything. Sta-pods and indiscriminately dumped rockpiles of small and large rocks cause underwater currents to disperse, creating underwater turmoil, sending currents in any direction, resulting in unpredictable erosion of a shoreline.

The message we should get from the foregoing observations is that blunt confrontational structures, in attempting to control surfwave action, only cause more damage than they were installed to prevent. We also must conclude that the only successful method is that of passive control wherein heavy, powerful masses of fast-moving water, from breaking waves on a beach, can be guided up the gentle slopes of dune-bases to an increasingly greater incline until a 'stall-point' is reached, not only causing each wave to stop and return seaward, but to deposit its sands in suspension in such a beneficial way that the dunes are also instruments of sand nourishment to the adjacent beach, and therefore also a stabilizing force in the best methods known to man—the natural scheme of things.

In view of the foregoing, it certainly would be rational to conclude that if blunt confrontational structures are removed from oceanfront sand beaches and only the passive method of wave-water control, as described above, is applied to such beaches, there should be dependable beach build-up and stabilization easily tolerating the normal, temporary, yearly cyclical erosion and accretion, from fall and winter, to spring and summer months, caused by seasonal changes along, for example, Long Island's oceanfront beaches, where, with a constant west-flowing littoral drift, the winds and storms in the cold months prevail out of the northeast, but the winds and storms in the warm months prevail from the southwest. The two easterly forces, combined in 'winter' erode the beaches, but the two opposing forces in 'summer' cause opposite-moving water-borne* sands to fall out of suspension at the points of contact occurring along the shoreline of those beaches, causing predictable restoration of the shoreline in time for the summer season.

If only passive processes are put back to work there would be every reason to expect that we would again have wide, stabilized beaches paralleling those indispensable sand-nourishment tools of the ages—the primary oceanfront sand dunes, which aid in building higher berms which could offset the sort of alleged consequences as stated in the following:

The questionable theory that such beaches will be diminished in width by a rise in sea-level rate of a foot by the year 2000; one foot, three inches by 2010; and three feet by 2040, has been disputed by a recently publicized contention that the 'greenhouse effect', caused by global warming from planet-wide carbon emissions, by the year 2000 shall not be permitted to continue, as international agreements are being reached to eliminate all present sources to be replaced by non-polluting alternative energy sources. Therefore, the future for our shorelines now appears to be brighter and 'bionic dunes' can be built without fear of their having to retreat from a steadily encroaching ocean, as apathy and ignorance is conquered in the proper treatment of our planet.

A number of U.S. Pats. have been issued which deal with beach destruction and related problems.

U.S. Pat. No. 20,105 issued in 1858, which illustrates how far back man has been dealing with this problem, discloses a sea wall consisting of a frame containing stones.

U.S. Pat. No. 591,256 shows a system of plants arranged to protect levees.

U.S. Pat. No. 1,428,808 illustrates the use of partially embedded walls to prevent the undermining of water washed banks.

U.S. Pat. No. 2,190,003 discloses the use of stone-settings on a sandy subsoil and the injection of a stabilizing agent under the stones for fixing and immobilizing water front property.

U.S. Pat. No. 4,345,856 describes the stabilization of embankments utilizing the development of growth on the embankment.

U.S. Pat. No. 4,362,432 shows the use of a sea wall with an energy dissipating and absorbing structure for preventing the erosion of beaches.

U.S. Pat. No. 4,367,978 describes apparatus for halting beach erosion employing prism-shaped slotted modules placed in the wave breaking areas.

U.S. Pat. No. 4,498,805 describes a breakwater made of modules designed to trap the wave water and to dissipate the energy in so-called water-to-water interactions.

U.S. Pat. No. 4,521,131 illustrates a lightweight semi-flexible dike made up of layers of mixtures of shells, sand and cement and the water side of the dike covered with a dike cover which is permeable to the water.

U.S. Pat. No. 4,804,293 discloses a flexible layer structure for use in covering earthworks subject to water contact.

None of the preceding patents teaches or suggests the present invention.

SUMMARY OF THE INVENTION

This invention largely overcomes the drawbacks and shortcomings of techniques utilized up to now to stabilize beach front property.

The invention depends on the use of a dune-structure system to control ocean-front heavy-weather surf-wave action without blunt collisions, thus avoiding the ensuing turmoil, which creates destructive side effects to surrounding topography.

In accordance with the principles of this invention there is provided a primary oceanfront dune structure which accomplishes several desired results. It prevents underwashing of the dune face, eliminates wave impact by relying on gravity rather than collision and channels, back to the sea, waves which otherwise would be capable of eroding any upland topography if they were allowed to continue in their original direction.

A preferred embodiment of the invention comprises a durable protective shielding containment-shell protecting its inner hard-packed sand mass, hydraulically built up, on top of several layers of broken concrete-sidewalk slabs placed inside the base of said dunes, in line with the elevation of their baseline for the primary purpose of further stabilizing the double line of tall poles which are set into the watertable, in order to create suction to prevent uplifting forces and prevent sinkage, as well, since water-packed sands are resistant to any further intrusions into their surfaces. The face of the dunes are concave on a vertical plane, shielded by impervious, high-impact-resistant, non-biodegradeable, heat and cold tolerant, non-eroding materials of choice, i.e., molded thermoplastics; reinforced resins; reinforced concrete; and others such as a new bulkheading grade material from recycled plastics now being tested by the Town of Islip, N.Y. to replace treated wood bulkheading, which may be made available in longer lengths required for best construction after this invention is patented. Also its contiguous toe is buried well under the thickness of the berm of the beach, to prevent undercutting into the base of said dunes and the underwashing of its contents. Further safeguards against underwashing and sinking is the placement of a bottom liner of durable, non-biodegradeable material under the slab-pile around the pilings mentioned above, to prevent slab sinkage as well as underwater intrusion during periods of high tides and water surges during hurricanes. The toe is attached to non-biodegradeable stringers, anchored underground to buried aggregate anchors, also of a non-biodegradeable material of choice. The face sections of the dunes are stabilized by a row of long pilings interconnected by supportive stringers to which they are attached at two points; under the crest and at mid-point, the area of the 90 degree 'stall point'. The peak of the dune projects only slightly, toward the sea, inducing high-climbing waves' waters to be directed away from the crest. The top of the dunes are covered with native, heavy-rooted two-to-three foot tall beachgrass which is indigenous to seashores in the northeastern U.S. Its massive root systems serve to hold large areas of sand together in its hair-roots, making an excellent deterrent to wind and water erosion, while its long, two-to-three foot long, blades catch any sand grains blowing from the beach, over the peak of primary dunes, thus capturing and holding them for the time the dunes exist. The face material is molded to go out slightly from and turn back over the peak, and to go two feet or so in a slightly depressed, pan-shape to accommodate the frontal planting of beachgrass roots in a line no higher than those naturally-rooted plants just behind (upland) from them to create a smooth flowing crest-line from peak to upland grasses. The gently sloping backs of the dunes are made as wide (base to upland) as possible, space permitting, because their width gives them their formidable strength in times of greatest stress—during hurricanes.

The height of the original natural primary oceanfront sand dunes, from top of berm of beach to top of dunes' face-peak has been estimated (by Fire Island national Seashore personnel) as having been up to 45 feet at their highest attainment along our Atlantic barrier beaches and approximately 25 feet at their lowest attainment before erosion. 'Bionic dunes' could be similar in height, depending upon choices of planners to meet the protective needs of a particular region.

The construction just described would make the use of devices such as groins, revetments, etc., obsolete along the shorelines of most ocean beaches as they have been seen to cause extremely damaging side effects as mentioned elsewhere in this application.

It is the inventors opinion, and that of many other knowledgeable seashore property owners of many years of experience, that, eventually, all blunt confrontational types of structures must be removed from beaches already damaged by their side effects (in order that restoration of damaged areas may be possible through passive-resistance).

It is thus a principal object of this invention to make available a structure which is capable of protecting, stabilizing and building up beaches without producing damaging side-effects to adjacent areas.

Other objects and advantages of this invention will become obvious from the following description of preferred embodiments of this invention.

BRIEF DESCRIPTION OF THE DRAWINGS

FIG. 1 is a cross section of a dune constructed in accordance with the principles of this invention.

FIG. 1A, 1B, and 1C, illustrate graphically the natural build-up of sand on a bionic dune.

FIG. 3 is a section taken along 3—3 of FIG. 1.

FIG. 4 is a detail showing construction of the crest of the dune.

FIG. 8 is a cross section of a dune constructed to permit access to the beach.

DESCRIPTION OF THE PREFERRED EMBODIMENTS

Figure 2:
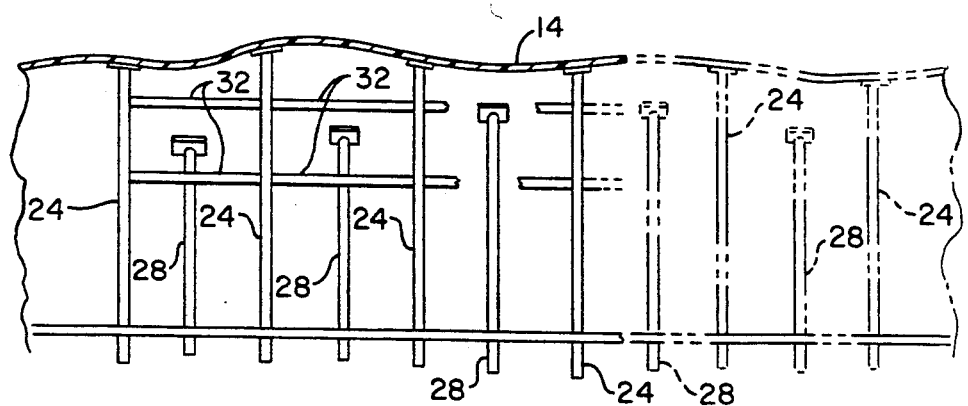
FIG. 2 is a section along 2—2 of FIG. 1.

Referring to FIGS. 1, 2, and 3, there is shown a dune 10 constructed in accordance with the principles of this invention. As is understood in the art, dune 10 extends along an ocean beach comprising the berm 12 with the mean high and low tides of the ocean indicated at H and L, respectively.

Dune face 11 of dune 10 extending along the length of the beach and facing the ocean is formed by a sheet 14 of impervious high-impact resistant non-biodegradable, non-eroding plastic extending from a toe 16 buried under berm 12 to a line 18 on the top of dune 10 where sheet 14 terminates. Sheet 14 is anchored by a first row of spaced anchors 22 parallel to the face for anchoring toe 16, a second spaced row of pilings 24 adjacent sheet 14 in a row below the crest 26 of dune face 11, and a third row of pilings 28 further inland. Pilings 24 are connected together by stringers 32 to insure that face 11 has adequate attachment to stabilize the face which will be described later. Pilings 24 and 28 also anchor the crest 26 of face 11.

Stringers 32 may be made of any suitable, long-lasting material such as 4"×6" treated wood or durable high-impact resistant plastic. Pilings 24 and 28 would typically be constructed of the same material used in pilings supporting docks and the like, i.e., wood which is treated to resist deterioration under the conditions of use. All pilings are set into the water-table's water-packed sands to obtain suction at their bases.

To construct dune 10, the area may or may not have to be excavated to permit a bottom liner 34 to be placed horizontally above the water table. Above liner 34 is built up a layer 36 of broken concrete slabs or slate, to further stabilize the long pilings. Liner 34 prevents the aggregate from settling through the sand below. None of the concrete ballast items are exposed to exterior forces Filling out the remainder of dune 10 is hard packed sand 38 which forms with the top end of face sheet 14 at line 18 a smooth top surface 42 on which beachgrass 44 is planted using beach sand for this purpose to stabilize the top of dune 10 as is understood in the art.

Figure 5:
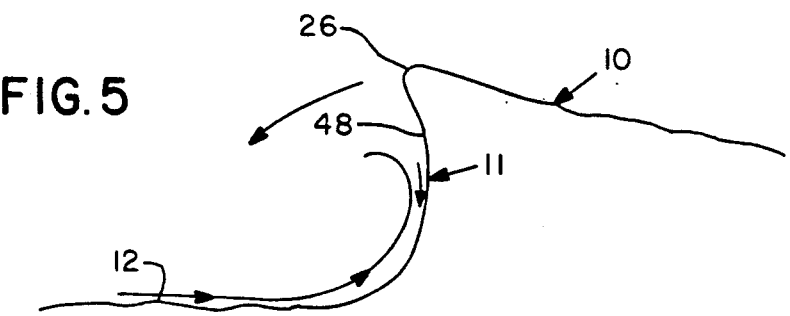
FIGS. 5 and 6 are schematic illustrations of wave action on a sand dune built in conformance with the principles of this invention.
Figure 6:
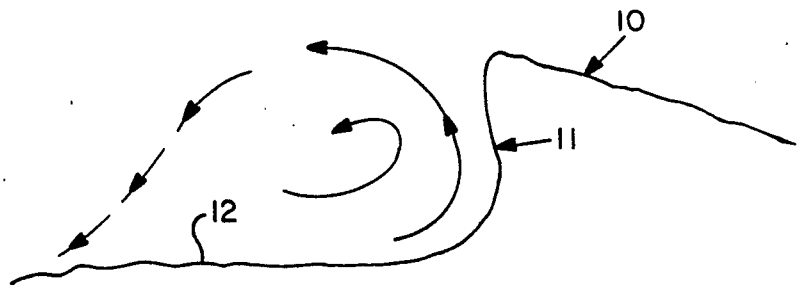

Dune face 11 is in the form of a vertically extending arc, concave in shape, which extends the length of dune 10 facing the ocean. Wind and water driven sand 46 deposits on the lower portion of the arc. As seen in FIG. 5, the height of dune 10 is such that for a given location the average wave will lose momentum at a point 48 below crest 26, this point being defined herein as the stall point. Larger waves will be turned back as seen in FIG. 6, so that the curvature of the arc formed by face 11 is such that the direction of all waves climbing against face 11 would be reversed.

As seen in FIGS. 1A, 1B, and 1C over a period of time is built up layers of sand, 10a, 10b, and 10c.

Figure 7:
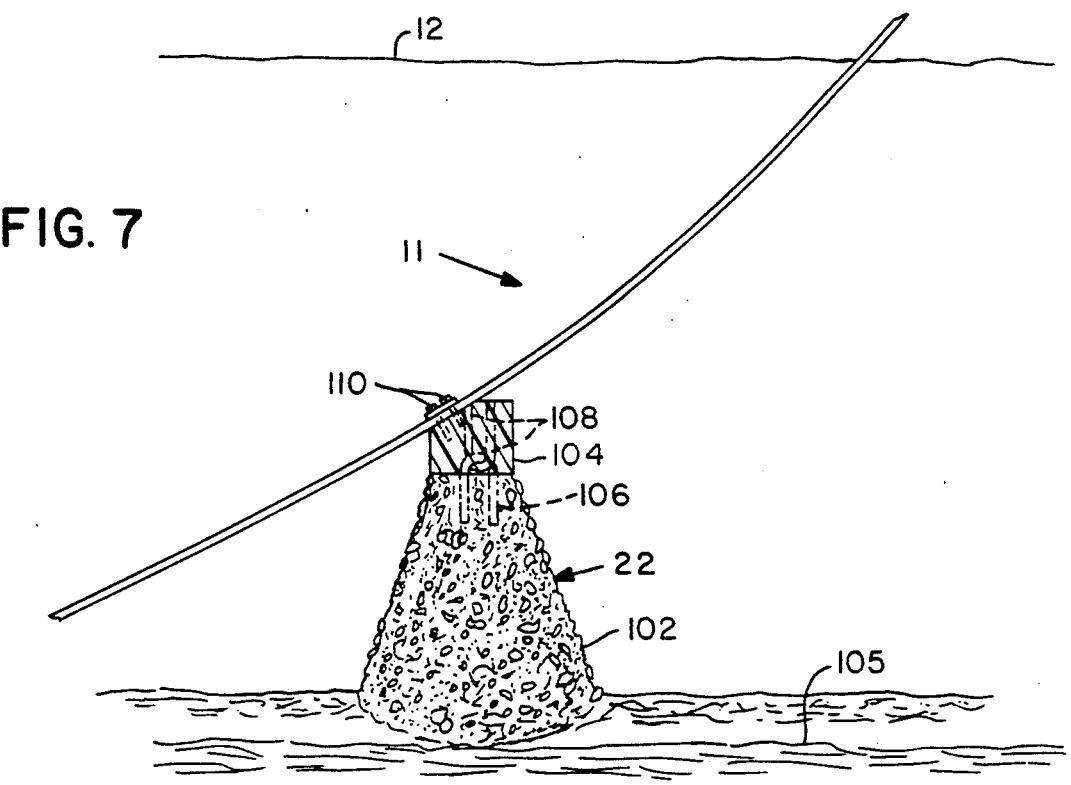
FIG. 7 is a detail showing one way of anchoring the lower part of a bionic dune.

For a detail of the manner in which toe 16 of dune face 11 is anchored, reference is made to FIG. 7. It will be seen that face 11 is provided with anchor 22 comprising a cemented pebble aggregate 102 pyramidal in configuration set below the top 12 of the berm of the beach extending up from the water table 105. Shown in cross section is a stringer 104 connected between anchors 22 and sheet 11. Stringer 104 is connected to aggregate 102. A U-bolt 108 is set through stringers 104 to engage loop 106. Lag bolts 110 are employed to attach face 11 to a face of stringer 104 Anchors 22 are spaced at 10–12 foot centers.

For more detail of the crest, reference is made to FIG. 4. Sheet 14 along the top of the dune is provided with holes 120 to encourage rooting into the sand below sheet 14. Hard packed sand 122 native to the area runs along the top of the dune, both above and below the horizontal section of sheet 14.

A modified dune construction to permit human access to the beach from behind the dune is shown in FIG.

8. Here, dune 200 otherwise identical to dune 10 previously described is provided, with access to the beach, at only within the bounds of a community and only minimally along the length of the beach. An inclined tunnel 210 is incorporated which can be formed by joined ten foot diameter sections of concrete reinforced pipe.

Steps 214 made of wood planks may be incorporated to facilitate movement through the tunnel, and railings may be provided if deemed to be desirable. A water tight door 216 hinged at the bottom may be utilized to close the tunnel during a hurricane, for example. For this purpose an electric lift motor 218 with a cable 218 may be used to open and close door 216.

At the top, a trap or other type of door 222 may be employed to close off the entrance to tunnel 210.

It will be seen from the construction of dune 10 that the breaking of waves occurs in a non-colliding and non-eroding manner so that dune 10 should remain stable indefinitely and under the most extreme circumstances.

In the event of a storm such as a hurricane which might cause waves to break over the top of dune 10 it will be seen that there is still no location where such waves are likely to cause any erosion.

While only certain preferred embodiments of this invention have been described it is understood that many variations are possible without departing from the principles of this invention as defined in the claims which follow.

An alternative to the use of slabs of broken concrete around the piling poles for added stabilization, as indicated in FIG. 1, would be the use of cross-bracing in the form of X's with short lengths of 2"×8" waterproof treated lumber, spiked to poles with #10 or larger common hot-dipped galvanized nails, thus eliminating not only the 'rocks', but the liner, as well.

The phenomenon of natural dunes' build-up against the seaward side of Bionic Dunes is an expected result of the design of a non-combative method of ocean wave-water control, during year-round storms and extremely high tides, devised to replace the increasingly controversial use of blunt-confrontational emplacements along oceanfront sand-beach shorelines. This invention creates not only a non-eroding 'civilization resistant' primary oceanfront dune line system to protect upland topography, as well as mainland shorelines behind barrier beaches, but also a structural system capable of serving as a catalyst in causing continual build-up of new sands during periods of heavy wave-water intrusions to the extend where the armored face of Bionic Dunes becomes, in due course, covered with new sands until they reach up to the peak of the dunes' crest while also extending seaward, over the berm, for a distance approximating the height of the peak of said crest, thereby forming a completely different face-profile at an angle of slope of approximately 45 degrees. After that plateau is attained, as shown in the upper right corner on the first page of DRAWINGS, under FIG. 1C, particularly in the dotted-line, identified as 10C, subsequent water-borne sands are deposited over the berm of the beach, resulting in a higher berm, which, in turn, causes new amounts of sand to build-up seaward of the mean high-tide line, resulting in a widening of the beach. We would then have a dune-line, resulting in a widening of the beach. We would then have a dune-line similar in appearance, but greater in internal strength to those unarmored dunes which existed up to the first quarter of this century, together with their high, wide beaches.

As such seaward progression develops, the limited beach-access tunnels, in the form of: 10-foot inside-diameter sections of reinforced concrete, lap-jointed pipe, could be extended as desired and end piece re-contoured to fit the changed incline. An alternative would be use of the conventional over-the-dune boardwalk-and-railinged steps, however, not as well favored becuase ANY structure on or near dunes can encourage wind-blasting effect on crests as well as faces and toes of unarmored natural additions, under discussion in this paragraph.

What is claimed is:

1. An artificially shielded dune for stabilizing an ocean front beach comprising:
   a. dune line means extending along said beach facing said ocean to receive the surf water of broken or breaking waves, said dune line means comprising a sheet of impervious, high impact resistant material extending from a point below the berm of said beach forming the toe of said sheet, said sheet curving upwardly and away from said toe forming a crest above said berm, having a concave surface facing said ocean;
   b. means comprising spaced pyramids of aggregate for rigidly securing said toe;
   c. means for backstopping the concave surface of said sheet to resist wave motion applied in pre-formed sections;
   d. said sheet curving over and extending away from said crest terminating in a line behind the crest-peak;
   e. a dune of water packed sand behind said concave surface with a sand surface formed contiguous with said crest extending away from said ocean; and
   f. a layer of vegetation formed on said crest and said sand surface to prevent erosion.

2. The artificial dune of claim 1 wherein a layer of solid aggregate is formed under said packed sand.

3. The artificial dune of claim 2 having a sheet of material under said aggregate to prevent sinking thereof.

4. The artificial dune of claim 3 wherein the means for securing said toe includes a plurality of treated timber stringers connecting said pyramids and bolted to said sheet.

5. The artificial dune of claim 4 wherein said means for stabilizing said concave surface comprises a plurality of spaced pilings attached midpoint and at the top thereof to said sheet under and behind the crest-peak.

6. The artificial dune of claim 5 wherein said spaced pilings backstopping said concave surface are interconnected with stringers.

7. The artificial dune of claim 6 wherein a row of spaced pilings are connected at the top thereof to said sheet adjacent said line where said sheet terminates.

8. The dune of claim 1 wherein said means for rigidly securing said toe comprises anchors sunk adjacent and under said toe, stringers interconnecting said anchors and means at spaced intervals connecting said toe to said stringers.

9. The dune of claim 8 wherein said anchors are cured concrete and pebble aggregates.

10. The dune of claim 1 wherein said sheet extending over the top of said dune is provided with openings to help root beachgrass along the top of said dune.

11. The dune of claim 1 having means for gaining access to said beach without going over said crest.

12. The dune of claim 11 wherein said access means comprises a tunnel passing through said dune downwardly sloping from the back of said dune to said berm.

13. The dune of claim 12 wherein said tunnel is provided with a closure at the face of said dune.

14. A method of stabilizing an ocean beach by forming a bionic dune comprising the steps of:
   a. mounting along the berm of said beach a sheet of impervious, high impact material having a vertically extending, concave shape facing said ocean to receive breaking waves in high tides and/or storms, said sheet having a toe planted beneath said berm and a crest which juts out toward said ocean;
   b. staking said toe with anchors;
   c. staking the midpoint and crest of said sheet with spaced pilings;
   d. forming a base of solid aggregate behind said sheet in order to stabilize said pilings and providing a bottom liner for said aggregate to prevent settling of said aggregate;
   e. hydraulically packing sand behind said sheet above said aggregate; and
   f. providing a layer of beachgrass extending along the top of said crest and said sand to stabilize back of said dune.

15. The method of claim 15 wherein stringers are mounted to join said pilings staking said crest to backstop said sheet for stabilization.

* * * * *